US012746810B2

(12) United States Patent
Nagasue et al.

(10) Patent No.: US 12,746,810 B2
(45) Date of Patent: Sep. 29, 2026

(54) DISCHARGE DEVICE FOR BATTERY COOLING AIR

(71) Applicant: Nissan Motor Co., Ltd., Yokohama (JP)

(72) Inventors: Hiroshi Nagasue, Kanagawa (JP); Yusuke Ochiai, Kanagawa (JP); Yo Kan, Kanagawa (JP)

(73) Assignee: Nissan Motor Co., Ltd., Yokohama (JP)

(*) Notice: Subject to any disclaimer, the term of this patent is extended or adjusted under 35 U.S.C. 154(b) by 211 days.

(21) Appl. No.: 18/841,747

(22) PCT Filed: Feb. 28, 2022

(86) PCT No.: PCT/JP2022/008315
§ 371 (c)(1),
(2) Date: Aug. 27, 2024

(87) PCT Pub. No.: WO2023/162230
PCT Pub. Date: Aug. 31, 2023

(65) Prior Publication Data
US 2025/0178427 A1 Jun. 5, 2025

(51) Int. Cl.
*H01M 10/613* (2014.01)
*B60K 1/04* (2019.01)
(Continued)

(52) U.S. Cl.
CPC ................ *B60K 11/06* (2013.01); *B60K 1/04* (2013.01); *H01M 10/613* (2015.04);
(Continued)

(58) Field of Classification Search
CPC .... B60K 1/04; B60K 11/06; B60K 2001/005; B60K 2001/0438; H01M 10/613; H01M 10/625; H01M 10/6563; H01M 50/358
See application file for complete search history.

(56) References Cited

U.S. PATENT DOCUMENTS 6,094,927 A * 8/2000 Anazawa .......... H01M 10/6563 62/239
2012/0312610 A1* 12/2012 Kim .................... H01M 10/625 180/65.31
(Continued)

FOREIGN PATENT DOCUMENTS

JP 2017-190044 A 10/2017

OTHER PUBLICATIONS

Extended European Search Report received for EP Application No. 22928756.0, mailed on Mar. 24, 2025, 9 pages.

*Primary Examiner* — Edwin A Young
(74) *Attorney, Agent, or Firm* — Spencer Fane LLP

(57) ABSTRACT

A discharge device includes an exhaust duct extending in a lateral direction of a vehicle from a battery mounted under the vehicle to a trim space. The exhaust duct is provided with a partition extending in a direction of the exhaust to form a front flow path and a rear flow path. The rear flow path has a cross-sectional area that is smaller than the cross-sectional area of the front flow path. A merging area is provided on the outlet side of the exhaust duct between the rear flow path and the front flow path. An air flowing to the front flow path is drawn due to the negative pressure of air flowing through the rear flow path for forming an exhaust flow toward the rear of the vehicle within the trim space.

5 Claims, 2 Drawing Sheets

(51) Int. Cl.

| | |
|---|---|
| ***B60K 11/06*** | (2006.01) |
| ***H01M 10/625*** | (2014.01) |
| ***H01M 10/6563*** | (2014.01) |
| ***H01M 50/358*** | (2021.01) |
| *B60K 1/00* | (2006.01) |

(52) U.S. Cl.
CPC ..... *H01M 10/625* (2015.04); *H01M 10/6563* (2015.04); *H01M 50/358* (2021.01); *B60K 2001/005* (2013.01); *B60K 2001/0438* (2013.01)

(56) References Cited

U.S. PATENT DOCUMENTS

| | | | |
|---|---|---|---|
| 2015/0060168 A1 | 3/2015 | Janarthanam et al. | |
| 2018/0015806 A1* | 1/2018 | Yasuda | B60L 58/26 |
| 2018/0056752 A1* | 3/2018 | Ogawa | B60H 1/00278 |

* cited by examiner

DISCHARGE DEVICE FOR BATTERY COOLING AIR

CROSS-REFERENCE TO RELATED APPLICATIONS

This application is a U.S. national stage application of International Application No. PCT/JP2022/008315, filed on Feb. 28, 2022.

BACKGROUND

Technical Field

The present invention relates to a battery cooling air discharge device that is used to discharge cooling air that has cooled a battery in a vehicle, such as an automobile.

Background Art

A battery cooling air discharge structure of the prior art is described, for example, in Japanese Laid-Open Patent Application No. 2017-190044 (hereinafter Patent Document 1). The battery cooling air discharge structure described in Patent Document 1 discharges cooling air that cools a battery disposed below the cabin of a vehicle to the outside of the vehicle through a drafter of the vehicle, and is equipped with an exhaust duct. The exhaust duct is formed between a floor panel and interior materials, extends in the direction in which the battery and the drafter are disposed, is connected at one end to the battery and a trim space that communicates with the outside of the vehicle via the drafter, and is connected at the other end with the trim space in a position from the battery to the drafter.

SUMMARY

The above-described battery cooling air discharge structure of the prior art can minimize costs by reducing the overall length of the exhaust duct; however, because heat may accumulate near the seatbelt anchors on the downstream side, further improvement is desired.

The present invention was devised in view of the foregoing circumstances and has as an object to provide a battery cooling air discharge device capable of preventing the accumulation of heat on the downstream side by forming an exhaust flow towards the rear of the vehicle inside the trim space.

A battery cooling air discharge device according to the present invention is a device that discharges battery cooling air and is disposed between a battery mounted under a vehicle and a trim space of the vehicle. The above-mentioned discharge device is provided with an exhaust duct that extends in the lateral direction of the vehicle from the battery to the trim space. The exhaust duct is provided with a partition that extends in the direction of the exhaust, and front and rear flow paths that are divided toward the front and rear of the vehicle by the partition. The discharge device is characterized in that the rear flow path has a smaller cross-sectional area than the front flow path, and by having a merging area of the rear and forward flow paths on the outlet side of the exhaust duct.

The battery cooling air discharge device provided with the above-described configuration discharges the battery cooling air into the trim space through the exhaust duct. When this occurs, because the cross-sectional area of the rear flow path divided by the partition is smaller than the cross-sectional area of the front flow path in the exhaust duct, the velocity of the air flowing through the rear flow path increases and the pressure decreases. The exhaust duct thus draws air passing through the front flow path by means of the negative pressure of the air flowing through the rear flow path in the merging area on the outlet side and releases the drawn air into the trim space. At this point, the battery cooling air discharge device draws the air that is toward the front of the vehicle toward the rear of the vehicle in the merging area, causing the air discharged into the trim space to flow toward the rear of the vehicle.

The battery cooling air discharge device according to the present invention can thus prevent the accumulation of heat on the downstream side by actively forming an exhaust flow towards the rear of the vehicle inside the trim space.

BRIEF DESCRIPTION OF THE DRAWINGS

Referring now to the attached drawings which form a part of this original disclosure, selected embodiments of this disclosure are illustrated.

DETAILED DESCRIPTION OF EMBODIMENTS

Figure 1:
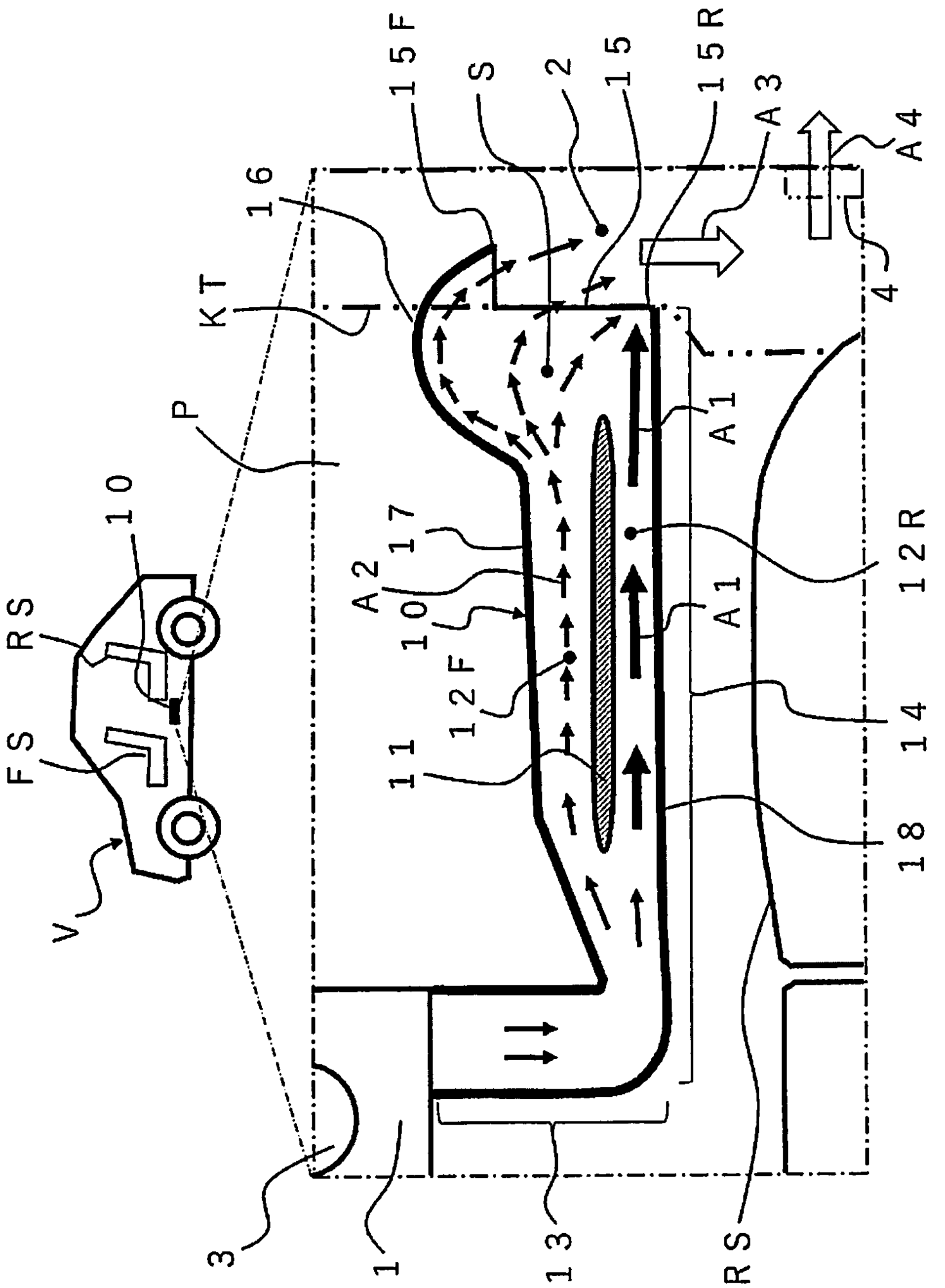
FIG. 1 is a horizontal cross-sectional view describing a first embodiment of a battery cooling air discharge device according to the present invention.
Figure 2:
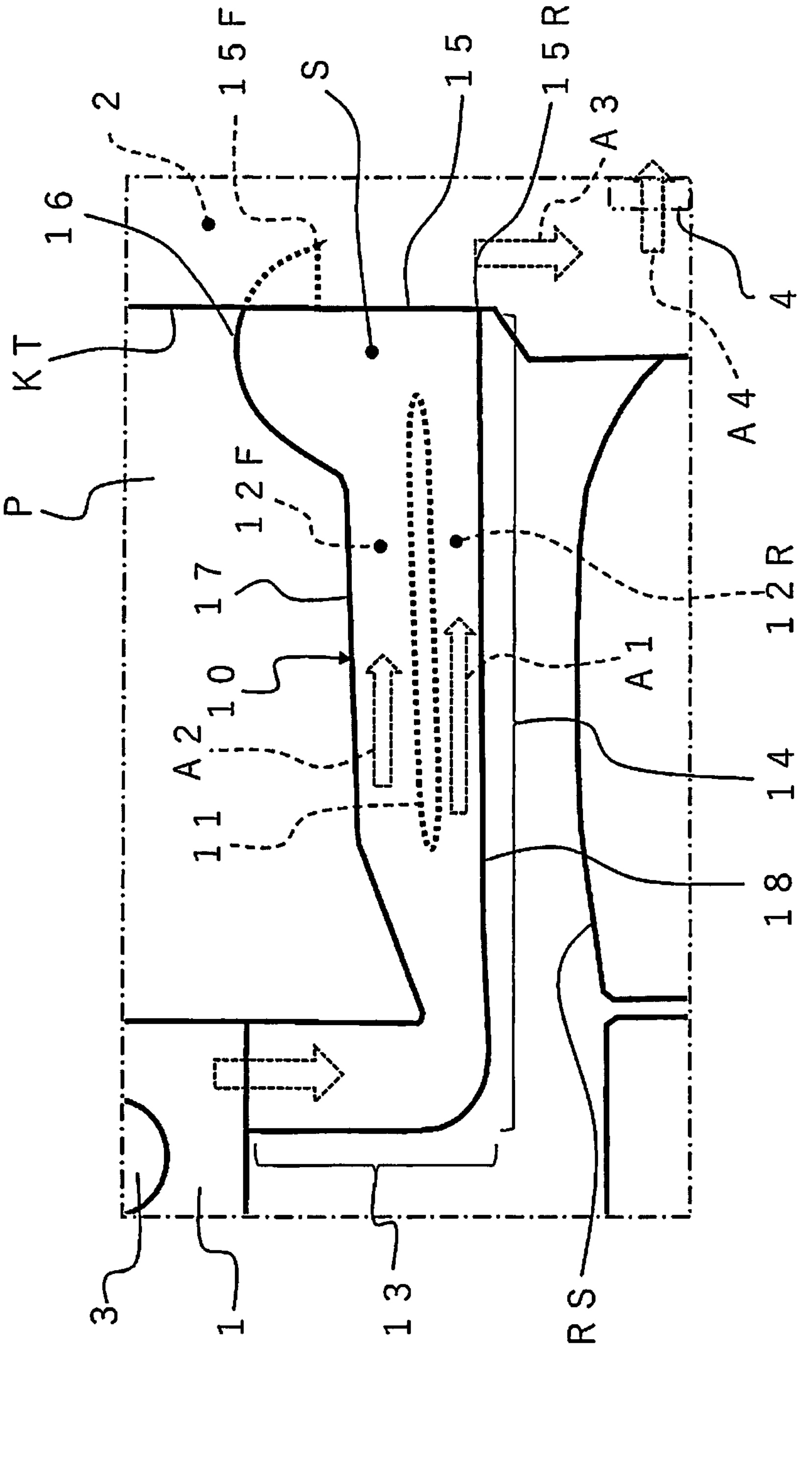
FIG. 2 is a plan view showing the battery cooling air discharge device with interior materials removed.

A battery cooling air discharge device shown in FIGS. 1 and 2 is disposed between a battery 1 mounted under a vehicle V and a trim space 2 of the vehicle V, and is used to discharge battery cooling air, i.e., air for cooling the battery 1. The discharge device shown in the drawings is disposed on a floor panel P of the vehicle V between a front seat FS and a rear seat RS of the vehicle V. Note that FIGS. 1 and 2 omit interior materials forming the floor of the vehicle cabin.

The battery 1 is housed in a case, not shown, and is cooled by the airflow from a fan 3, the battery cooling air being discharged through an exhaust port provided in the case. The trim space 2 shown in the drawings is formed under a rear kicking trim KT of the vehicle V. In the figures, a drafter 4 that moves exhaust to the outside of the vehicle is shown in the trim space 2 for the sake of convenience. In practice, the trim space 2 communicates with a side trim space in the trunk space at the rear of the vehicle, and the drafter 4 is disposed in this side trim space.

The discharge device is provided with an exhaust duct 10 that extends in the lateral direction of the vehicle V from the battery 1 to the trim space 2. The exhaust duct 10 is provided with a partition 11 that extends in the direction of the exhaust, and a forward flow path 12F and a rear flow path 12R divided toward the front and rear of the vehicle V by the partition 11, the rear flow path 12R having a cross-sectional area that is smaller than the cross-sectional area of the front flow path 12F.

The structure of the partition 11, which is configured as a wall section integrally formed within the exhaust duct 10, is not particularly limited as long as said partition separates the front and rear flow paths 12F and 12R. Further, there is a merging area S of the front and rear flow paths 12F, 12R at the outlet side of the exhaust duct 10.

The exhaust duct 10 shown in the illustrated example is provided with a connecting flow path pipe 13 that is connected to the exhaust port of the battery 1 and extends towards the rear of the vehicle (downward in the cross-sectional view), and a main flow path pipe 14 that turns at approximately a right angle from the connecting flow path pipe 13 and extends in the lateral direction of the vehicle.

Inside the main flow path pipe 14, the partition 11, the front flow path 12F, the rear flow path 12R, and the converging region S described above are formed in the exhaust duct 10 along the longitudinal direction thereof, and an exhaust port 15 is provided at the terminal end, which opens into the trim space 2.

Further, the exhaust duct 10 has a guide wall 16, in which the merging area S side is a concave curved surface, at the outlet of the front flow path 12F. This guide wall 16 is formed continuously with a wall section 17 of the main flow path pipe 14 on the side toward the front of the vehicle in the plan view shown in FIG. 1, forming an approximately semicircular shape and reaching a front end 15F of the exhaust port 15.

In contrast, a wall section 18 of the main flow path pipe 14 on the side towards the rear of the vehicle is continuous with the connecting flow path pipe 13 and reaches a rear end 15R of the exhaust port 15. The exhaust port 15 is shaped such that the front end 15F on the guide wall 16 side projects further into the trim space 2 than the rear end 15R.

Further, in a more preferable embodiment of this exhaust device, the front flow path 12F may have a shape with a cross-sectional area that gradually expands in the direction of the exhaust. In the example shown in the figures, the cross-sectional area is caused to gradually expand by a slight inclination of the wall section 17 of the exhaust duct 10 on the side towards the front of the vehicle in the longitudinal direction of the partition 11. In one example, the main flow path pipe 14 of the exhaust duct 10 is a flat rectangular tube having an overall uniform thickness (height).

The battery cooling air discharge device with the above-described configuration discharges the battery cooling air through the exhaust duct 10 into the trim space 2. At this point, the exhaust duct 10 is such that the cross-sectional area of the rear flow path 12R divided by the partition 11 is smaller than the cross-sectional area of the front flow path 12F, so that the velocity of air A1 flowing through the rear flow path 12R increases as the pressure decreases. As a result, the exhaust duct 10 draws air A2 passing through the front flow path 12F by means of the negative pressure of the air A1 passing through the rear flow path 12R in the merging area S on the outlet side, and releases both the air A1 and A2 into the trim space 2.

At this point, since the above-mentioned battery cooling air discharge device draws air from the front side of the vehicle toward the rear side of the vehicle in the merging area S, the air discharged into the trim space 2 flows toward the rear of the vehicle, as indicated by the arrow A3. This air A3 is finally discharged out of the vehicle through the drafter 4, as indicated by the arrow A4.

Thus, the above-described battery cooling air discharge device can prevent the accumulation of heat downstream, e.g., near the seatbelt anchors, by actively forming an exhaust flow toward the rear of the vehicle within the trim space 2.

Further, as shown in FIG. 1, in the above-described battery cooling air discharge device, the exhaust duct 10 is located under the interior materials near the footwell of the rear seat RS, but the partition 11 functions as reinforcement to prevent deformation of the exhaust duct 10.

Further, in the above-described battery cooling air discharge device, the exhaust duct 10 has the guide wall 16 in which the merging area S side is a convex curved surface at the outlet of the front flow path 12F.As a result, in the above-described discharge device, the air A2 that has passed through the front flow path 12F is diffused in the merging area S and rectified by traveling along the guide wall 16, and, coupled with the suction due to the negative pressure of the air A1 passing through the rear flow path 12R, can smoothly form the airflow A3 towards the rear of the vehicle.

Further, the battery cooling air discharge device has a shape in which the cross-sectional area of the front flow path 12F gradually expands in the direction of the exhaust, thereby gradually decreasing the speed of the air A2 flowing to the front flow path 12F, which can suppress the air blowing noise. Moreover, the above-described exhaust device can increase the suction effect of the air A1 passing through the rear flow path 12R by increasing the pressure differential relative to the air A1 flowing through the rear flow path 12R.

Further, in the above-described battery cooling air discharge device, the trim space 2 is formed on the underside of the rear kicking trim KT of the vehicle V. The above-mentioned discharge device can thereby prevent air from flowing toward the front of the vehicle, e.g., prevent air leakage through the seatbelt holes in the center pillar, and since the trim space 2 is used as a duct, the exhaust duct 10 can be made smaller, lighter in weight, and lower in cost.

Further, in the above-described battery cooling air discharge device, the trim space 2 communicates with the drafter 4 located at the rear of the vehicle V, allowing the smooth discharge of the battery cooling air to the outside of the vehicle by utilizing the interior space of the vehicle V as a flow path.

The configuration of the battery cooling air discharge device according to the present invention is not limited to the foregoing embodiment and may be modified as deemed suitable without departing from the essence of the present invention.

The invention claimed is:

1. A battery cooling air discharge device for discharging cooling air for a battery mounted under a vehicle, the device being disposed between the battery and a trim space of the vehicle, the device comprising:

an exhaust duct extending in a lateral direction of the vehicle from the battery to the trim space, the exhaust duct including a partition extending in an exhaust direction, and the partition dividing the exhaust duct in a front flow path and a rear flow path with respect to a front and a rear of the vehicle, the rear flow path having a cross-sectional area smaller than a cross-sectional area of the front flow path, a merging area being disposed on an outlet side of the exhaust duct between the rear flow path and the front flow path, the exhaust duct being a pipe extending continuously from the battery to an exhaust port, and the partition being integrally formed with the pipe of the exhaust duct.

2. The battery cooling air discharge device according to claim 1, wherein the exhaust duct has a guide wall with a merging area side being a concave curved surface at an outlet of the front flow path.

3. The battery cooling air discharge device according to claim 1, wherein the front flow path has a shape in which the cross-sectional area of the front flow path gradually expands in the exhaust direction.

4. The battery cooling air discharge device according to claim 1, wherein the trim space is formed under of a rear kicking trim of the vehicle.

5. The battery cooling air discharge device according to claim 4, wherein the trim space communicates with a drafter disposed at the rear of the vehicle.

* * * * *